US010387239B2

(12) United States Patent
Kondapalli et al.

(10) Patent No.: US 10,387,239 B2
(45) Date of Patent: Aug. 20, 2019

(54) DETECTING MEMORY FAILURES IN THE RUNTIME ENVIRONMENT

(71) Applicant: Western Digital Technologies, Inc., San Jose, CA (US)

(72) Inventors: Sateesh Kondapalli, Milpitas, CA (US); Sri Rama Namala, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 164 days.

(21) Appl. No.: 15/483,917

(22) Filed: Apr. 10, 2017

(65) Prior Publication Data

US 2018/0293123 A1    Oct. 11, 2018

(51) Int. Cl.
*G06F 11/00* (2006.01)
*G06F 11/07* (2006.01)

(52) U.S. Cl.
CPC ........ *G06F 11/079* (2013.01); *G06F 11/0727* (2013.01); *G06F 11/0751* (2013.01); *G06F 11/0772* (2013.01)

(58) Field of Classification Search
CPC ............................ G06F 11/079; G06F 11/0727
See application file for complete search history.

(56) References Cited

U.S. PATENT DOCUMENTS

| 6,014,724 | A | 1/2000 | Janett |
| 6,895,464 | B2 | 5/2005 | Chow et al. |
| 8,095,650 | B1 * | 1/2012 | Cheng ................ G06F 11/32 709/203 |
| 8,645,776 | B2 | 2/2014 | Byom et al. |
| 8,904,088 | B2 | 12/2014 | Heo et al. |
| 9,047,922 | B2 * | 6/2015 | Higley ............... G06F 11/0727 |
| 10,082,965 | B1 * | 9/2018 | Tamilarasan ........... G06F 12/00 |
| 2004/0218440 | A1 * | 11/2004 | Kumar ................. G11C 29/16 365/202 |
| 2005/0182851 | A1 * | 8/2005 | Buckler ............. G06F 11/1433 709/238 |

(Continued)

FOREIGN PATENT DOCUMENTS

EP    2264602 A1    12/2010

OTHER PUBLICATIONS

Sau-Kwo Chiu "Diagonal Test and Diagnostic Schemes for Flash Memories" dated 2002, 2 pages, Test Conference, 2002. Proceedings, International.

(Continued)

*Primary Examiner* — Christopher S McCarthy
(74) *Attorney, Agent, or Firm* — Patent Law Works LLP

(57) ABSTRACT

A computer-implemented method for detecting real flash failures in a runtime environment and determining the cause of the failure may include identifying a software parameter and a hardware parameter associated with a flash memory device at runtime; storing the software parameter and the hardware parameter in a failure detector module coupled to the flash memory device; detecting a flash translation layer failure associated with the flash memory device; performing analysis of the software parameter and the hardware parameter stored in the failure detector module by comparing them to predefined thresholds; and determining a cause of the flash translation layer failure based on the performed analysis.

18 Claims, 7 Drawing Sheets

(56) References Cited

U.S. PATENT DOCUMENTS

| | | | |
|---|---|---|---|
| 2005/0190615 A1* | 9/2005 | Linde | G11C 29/4401 |
| | | | 365/200 |
| 2007/0255982 A1* | 11/2007 | Adsitt | G11C 29/56 |
| | | | 714/718 |
| 2010/0050053 A1* | 2/2010 | Wilson | G06F 11/1068 |
| | | | 714/773 |
| 2010/0131809 A1* | 5/2010 | Katz | G06F 12/0246 |
| | | | 714/719 |
| 2013/0151914 A1* | 6/2013 | Cadigan | G06F 11/1068 |
| | | | 714/723 |
| 2013/0219247 A1* | 8/2013 | Yang | G06F 11/1048 |
| | | | 714/766 |
| 2014/0143618 A1* | 5/2014 | Griffin | G11C 16/349 |
| | | | 714/718 |
| 2014/0237263 A1* | 8/2014 | Suzuki | G06F 12/1408 |
| | | | 713/193 |
| 2014/0237298 A1 | 8/2014 | Pe'er | |
| 2016/0041870 A1* | 2/2016 | Davis | H03M 13/353 |
| | | | 714/773 |
| 2017/0068468 A1* | 3/2017 | Rothberg | G06F 3/061 |
| 2017/0286205 A1* | 10/2017 | Jeong | G06F 3/0619 |

OTHER PUBLICATIONS

Chin-Hsien Wu "A Bad-Block Test Design for Multiple Flash-Memory Chips" dated Dec. 20, 2010, pp. 1091-1104, Journal of Information Science and Engineering 28.

Jon Hoekwater "Bus Analyzer Uncovers Root Cause of Failure in Flash-Enabled Systems" printed Jul. 4, 2016 <http://core.cypress.com/article/bus-analyzer-uncovers-root-cause-of-failure-in-flash-enabled-systems/#.VwXzn.lx95kg> 6 pages, Cypress Inc.

* cited by examiner

DETECTING MEMORY FAILURES IN THE RUNTIME ENVIRONMENT

FIELD OF THE INVENTION

The present disclosure generally relates to detecting real memory failures in a runtime environment. In particular, the present disclosure is related to detecting real flash memory failures and determining the cause of the failure for a flash memory device in a runtime environment.

BACKGROUND

The capacity of flash-based solid-state drive (SSD) arrays is growing day by day, with hundreds of terabytes. All these arrays are built with multiple flash nodes. Each flash node may in turn contain multiple flash memory units that are supplied by multiple different vendors. On occasion, a flash memory unit may be detected as unresponsive by a flash translation layer (FTL) at runtime, which may necessitate replacement of the unresponsive flash memory unit or a flash node containing the unresponsive flash memory unit.

The replacement of the unresponsive flash memory unit might not be necessary, as the unresponsiveness of a flash memory unit at runtime may be due to various reasons, such as a failure of a flash memory unit itself, environmental conditions (e.g. temperature, power supply, etc.), or other software and hardware bugs. Aiming to limit operational cost, negative publicity, revenue loss, and to improve manufacturing quality in the future, a vendor and/or manufacture of the flash memory unit may want to diagnose a cause of the unresponsiveness of the flash memory unit to avoid the replacement of unresponsive flash memory unit.

Current state-of-art systems provide very limited information for diagnosing causes of an unresponsive flash memory unit at runtime. Except the flash memory unit itself, important information affecting normal operation of the flash memory unit is generally not available, especially information about the run-time environment at the moment the unresponsiveness is detected. This may greatly affect accurate diagnosis of the detected unresponsiveness for the flash memory unit.

SUMMARY

The present disclosure relates to systems and methods for detecting real flash failures in a runtime environment and determining the cause of the failure.

According to one innovative aspect of the subject matter in this disclosure, a system comprising a processor and memory storing instructions, that, when executed, cause the system to perform operations including identifying a software parameter and a hardware parameter associated with a flash memory device at runtime; storing the software parameter and the hardware parameter in a failure detector module coupled to the flash memory device; detecting a flash translation layer failure associated with the flash memory device; performing analysis of the software parameter and the hardware parameter stored in the failure detector module by comparing them to predefined thresholds; and determining a cause of the flash translation layer failure based on the performed analysis.

In general, another innovative aspect of the subject matter described in this disclosure may be implemented in methods that include identifying a software parameter and a hardware parameter associated with a flash memory device at runtime; storing the software parameter and the hardware parameter in a failure detector module coupled to the flash memory device; detecting a flash translation layer failure associated with the flash memory device; performing analysis of the software parameter and the hardware parameter stored in the failure detector module by comparing them to predefined thresholds; and determining a cause of the flash translation layer failure based on the performed analysis.

Other implementations of one or more of these aspects include corresponding systems, apparatus, and computer programs, configured to perform the actions of the methods, encoded on computer storage devices.

These and other implementations may each optionally include one or more of the following features. For example, the software parameter is one from the group of a time to read a first file from the flash memory device, a time to write a second file into the flash memory device, a time to erase a flash block of the flash memory device, and a time to reset the flash memory device; the hardware parameter is one from the group of a temperature, a humidity, a voltage, a power supply, and a power frequency related to the flash memory device; each of the software parameter and the hardware parameter carries a timestamp; the cause of the flash translation layer failure is one from the group of a flash memory device failure, an environmental hardware failure, a software bug, and a hardware bug; or the failure detector module is a programmable system-on-chip in a flash node, the programmable system-on-chip including a plurality of independent pins for connecting to each of a plurality of flash packages in the flash node.

The operations may additionally include identifying a device number of the flash memory device; identifying a flash blade to which the flash memory device is connected based on the device number; transmitting a system management bus protocol command to the failure detector module; and wherein performing analysis includes using the system management bus protocol command.

Additionally, where determining the cause of the flash translation layer failure based on the performed analysis is a flash memory device failure, the operations may include transmitting a protocol command to the failure detector module; implementing the protocol command to mark the flash memory device as bad; and releasing the flash memory device from further file system operations.

For example, performing analysis of the software parameter and the hardware parameter may include running a diagnostic command in the failure detector module for the flash memory device; recording a second software parameter and a second hardware parameter based on running the diagnostic command; performing additional analysis of the second software parameter and the second hardware parameter by comparing them to predefined thresholds; and wherein determining the cause of the flash translation layer failure is also based on the additional analysis.

These implementations are particularly advantageous in a number of respects. For instance, the technology described herein allows runtime data including environmental data to be collected for diagnosing a cause of a detected flash translation layer failure for an associated flash memory device. With various runtime data, the technology described herein, therefore, can efficiently and accurately determine a cause of the detected flash translation layer failure for the associated flash memory device, which may prevent unnecessary replacement of the associated flash memory device when facing the detected flash translation layer failure. For example, the present disclosure is able to differentiate flash memory device failure, an environmental hardware failure, a software bug, and a hardware bug. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure describes systems and method for efficiently identifying a cause of a flash translation layer (FTL) failure associated with a flash memory device. A flash translation layer (FTL) is one of the controlling components that manage file system input/output (I/O) operations related to the flash memory device. Occurrence of the FTL failure might be due to various different reasons. The present disclosure describes systems and methods to rapidly and accurately identify a cause of the detected FTL failure among various possibilities.

The systems and methods may determine the cause of the detected FTL failure based on collected data at runtime that likely affect normal operation of a flash memory device. The collected data may include hardware parameters related to environment conditions of the flash memory device, as well as software parameters related to operation of the flash memory device itself.

The software and hardware parameters are collected at runtime, therefore, the collected data may precisely reflect conditions and what is actually happening at the moment of FTL translation layer failure occurs and is detected. Failure analysis streamlined by the collected runtime data may allow tracking a likely cause of the FTL failure that may be directed to a specific running environment failure, but not the flash memory device itself, which may then avoid unnecessary replacement of the associated flash memory device and limit operational cost and revenue loss.

The systems and methods of the present disclosure advantageously capture data at the exact moment of FTL failure and thus avoid re-collecting of data for failure analysis of a questionable flash memory device under different environments (e.g. at a vendor site), which may complicate the failure analysis. The failure analysis based on the data collected from the exact moment of failure may provide a more convincing feedback to a client or an end-user if the associated flash memory device happens not to be at fault, which may limit negative publicity for the vendor and/or manufacture for the associated flash memory device.

The above and various other features and advantages may be apparent from further details of the system and method embodiments as described in the following.

Figure 1:
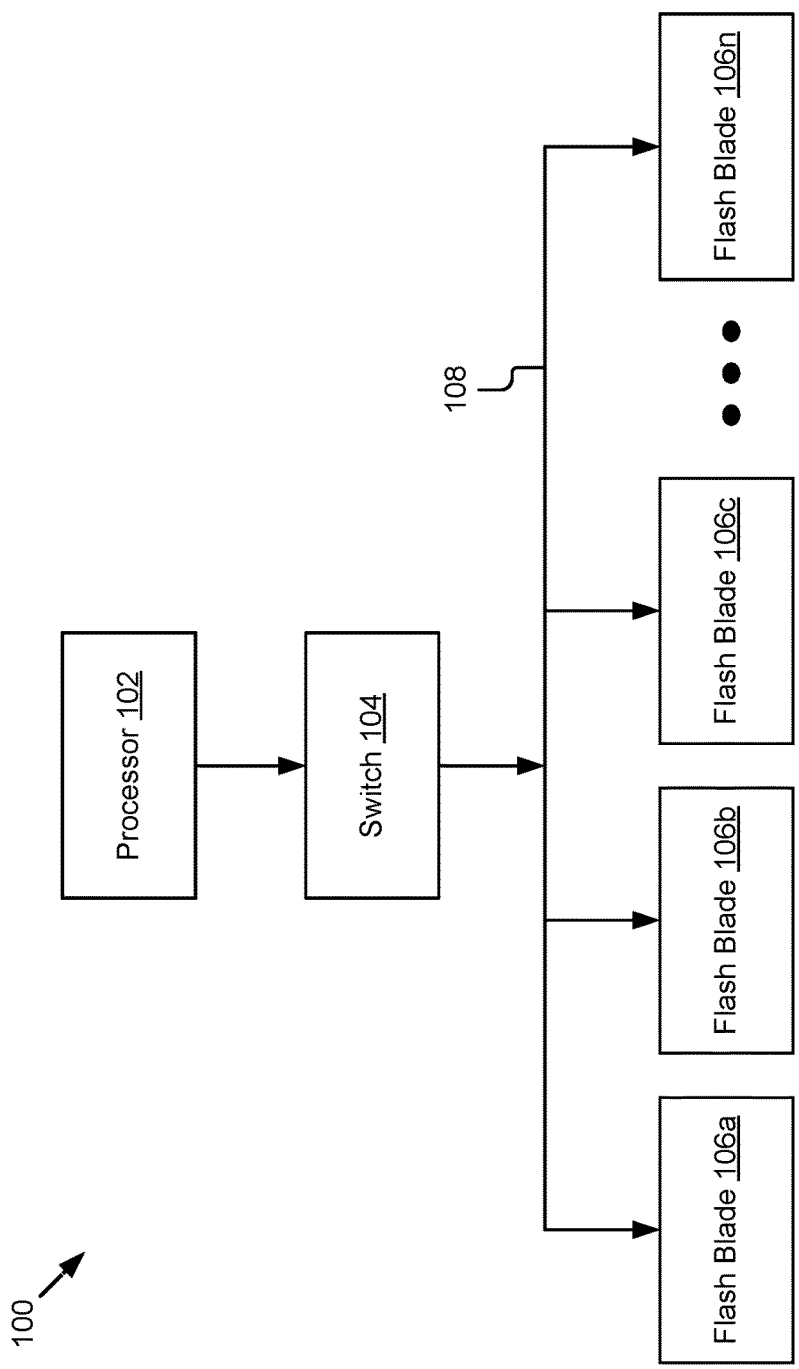
FIG. 1 is a block diagram illustrating an example flash array.

FIG. 1 is a block diagram illustrating an example flash array for data storage and management. The flash array 100 may include a processor 102, multiple flash blades 106a, 106b, 106c, . . . 106n (individually and collectively referred to as 106), and a switch 104 that set ups hardware interface between the blades 106 and the processor 102 for data transfer. The switch 104 and the flash blades 106 are communicatively coupled to a communication bus 108 for communication with each other. In implementations, the flash array 100 might be implemented in different host computing systems or devices to support data storage functions in these systems and devices, such as a server for cloud storage, data center, etc.

The processor 102 includes an arithmetic logic unit, a microprocessor, a controller, or some other processor array to perform computations and transfer data to the flash blades. The processor 102 may process data signals and may have various computing architectures including a complex instruction set computer (CISC) architecture, a reduced instruction set computer (RISC) architecture, or an architecture implementing a combination of instruction sets. Although only a single block for the processor 102 is shown in FIG. 1, the processor 102 may include one or more processors and/or microprocessors that are currently available or will be developed in the future. Alternatively and/or additionally, the processor 102 may include or operate in conjunction with other suitable components or circuits (e.g., application-specific integrated circuits (ASICs) or field-programmable gate arrays (FPGAs)) that contain logic blocks and are capable of controlling various operations of the flash blades 106. In a processor-based implementation, the processor 102 may execute general or specific firmware and software programs loaded into the flash blades 106, or execute vendor and/or technology-specific instructions to perform various storage management and access functions for the flash blades 106.

The switch 104 is a hardware component that sets up connections between the processor 102 and multiple flash blades 106 in the flash array 100. In some embodiments, the switch 104 may be a peripheral component interconnect express (PCI Express) bus. The PCI Express bus is a high-speed serial computer expansion bus standard that may contain switches to create multiple endpoints out of one endpoint to allow sharing one endpoint (e.g. the processor 102) with multiple devices (e.g. the multiple flash blades 106). The PCI Express bus may also support full-duplex communications between two flash blades 106 with no inherent limitation on concurrent access across the multiple flash blades 106. In some embodiments, the switch 104 may be a serial attached SCSI (SAS) connector that uses a point-to-point serial protocol to transfer data to and from computer storage devices, such as the multiple flash blades 106. The SAS connector may contain an expander that facilitates connection of multiple SAS end devices to a single port of an initiator device. Except the PCI Express bus and the SAS connector, other switches or interfaces may exist to allow point-to-point communications of a single processor with multiple flash blades, which are also contemplated and fall within the scope of the present disclosure.

The flash blades 106 are actual data storage units in the flash array 100. The number of flash blades 106 in the flash array 100 may vary and depends on the system architecture provided by each vendor. Each flash blade 106 may be of varying capacities. For instance, a flash blade 106a may have a 2 TB capacity, while a flash blade 106b may have an 8 TB capacity. Although the flash array 100 is depicted with a cluster of the flash blades 106 in the illustrated implementation, the flash array 100 may also be replaced with a hybrid array containing both flash blades and traditional spinning-disk counterparts, or an array containing only spinning-disk counterparts without any flash blades.

The flash blades 106 may support hot swap like a regular hard disk in rack-style architecture. The hot-swap may allow a client or end-user to replace a failed flash blade 106 with a duplicated flash blade with negligible down-time of the related data in the replaced flash blade.

Figure 2:
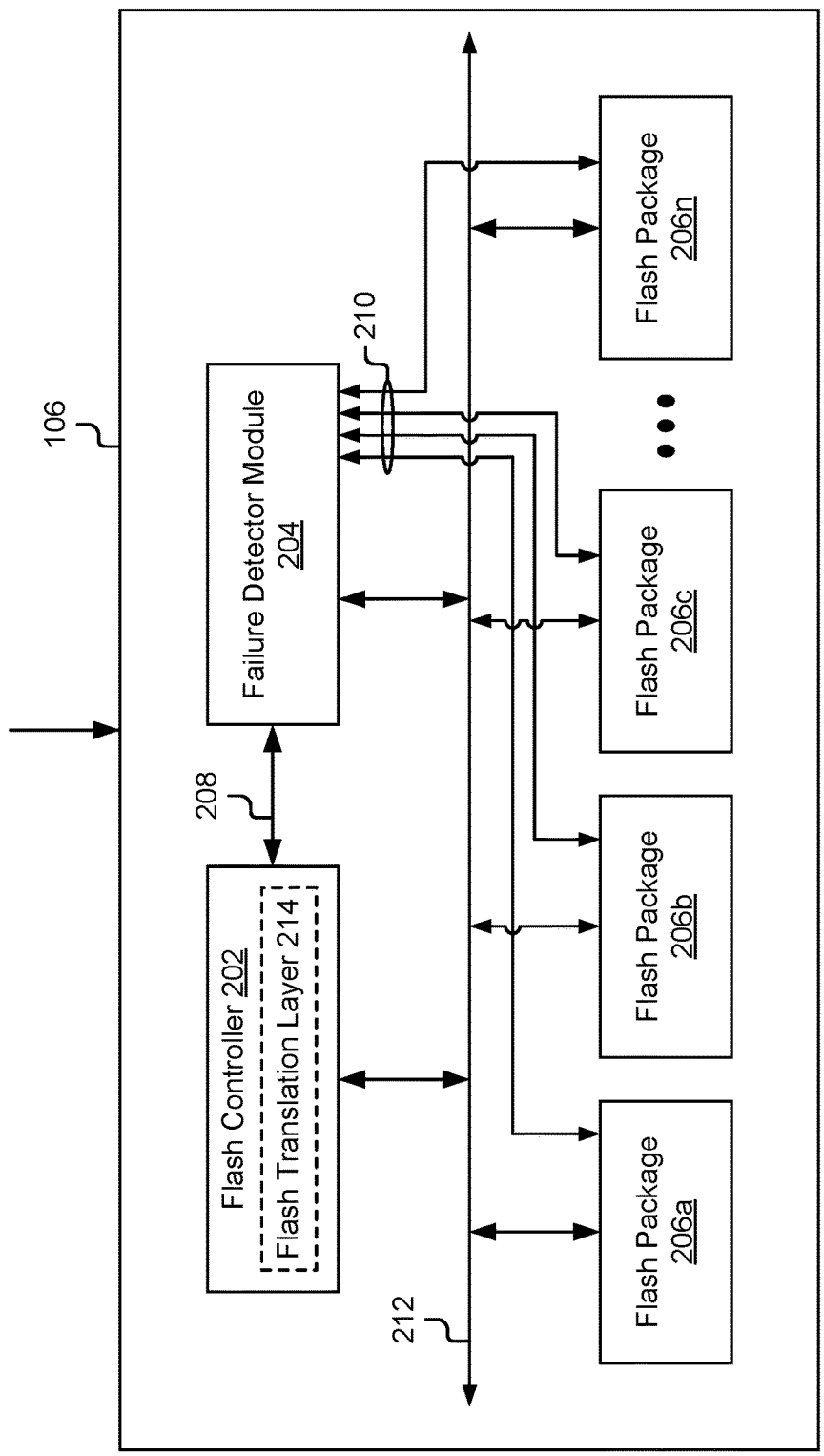
FIG. 2 is a block diagram illustrating an example flash blade.

FIG. 2 is a block diagram illustrating an example flash blade 106. As depicted in FIG. 2, the flash blade 106 may include a flash controller 202, a failure detector module 204, and a plurality of flash packages 206a, 206b, 206c, . . . 206n (together referred as 206), which may be electronically coupled by a communication bus 212 for cooperation and communication with each other. The failure detector module 204 may additionally be coupled to communicate with the flash controller 202 via the signal line 208, and with each of the flash packages 206 via the signal lines 210. The signal line 208 may be a system management bus (SMBUS) containing a single-ended simple two-wire bus for light-weight communication between the flash controller 202 and the failure detector module 204.

The flash packages 206 are flash memory devices that physically store data in the flash node 106. In some embodiments, other similar electronic non-volatile computer storage devices may be used instead of flash. Each flash package 206 may include further multiple flash blocks with each block containing multiple flash pages. In some embodiments, a flash package 206 may include a metadata area and a user data area. The metadata area may include reserved blocks for replacing initial or run-time bad blocks, map blocks for translating logical to physical addresses, and write buffer blocks for temporarily storing the incoming write data. The user data area may include a fixed number of data blocks in which user data resides. In some embodiments, a flash package 206 may be a non-volatile computing storage medium that can be electrically erased or reprogrammed.

The flash controller 202 is hardware (ASIC/FPGA), software, code, logic, or routines that manages data storage in the flash packages 206 and communicates with other components of the flash array 100. In some embodiments, the flash controller 202 may be responsible for essential operations in the flash packages 206 to which it is connected. For instance, the flash controller 202 may be responsible for flash package initial set up, reading, writing and erasing operations, wear-levelling, mapping, garbage collection, etc. By wear-levelling, the flash controller 202 may distribute writing operations as evenly as possible across all flash blocks in a flash package so that all the flash blocks in the flash package 206 fail at the same time in the wearing out process. By garbage collection, the flash controller 202 may erase blocks that contain idle files (e.g., files that are modified and the modified copy is stored in other blocks) so that new data can be written into. By mapping, the flash controller 202 may map file system logical block addresses (LBAs) to physical addresses of a flash package 206 so that the LBAs managed by a file system can be mapped to a physical location (block ID, page ID, etc.) in the flash package 206.

In some embodiments, the flash controller 202 may additionally include a FTL 214. The flash translation layer (FTL) 214 is software, code, logic, or routine that may handle the mapping process, as well as some other functions of the flash controller 202, such as garbage collection, wear-levelling, etc. In some embodiments, the FTL 214 may reside within a firmware of the flash controller 202, as illustrated in the FIG. 2. In some embodiments, such as in certain flash cards, the flash controller 202 may rely on a host computing system to use host central processing unit (CPU) cycles and dynamic random-access memory (DRAM) to provide FTL functionalities.

The failure detector module 204 includes software, code, logic, or routines that monitors FTL failures for each flash package 206 to which it is connected. The failure detector module 204 may communicate with the flash controller 202 through the signal line 208, and each of the flash packages 206 through individual signal lines 210 to monitor the connected flash packages 206. In some embodiments, the failure detector module 204 may receive commands from the flash controller 202 and implement the received commands for monitoring a specific flash package 206. The commands may instruct the failure detector module 204 to collect and analyze software and hardware parameters related to running status of the specific flash package 206. In some embodiments, the failure detector module 204 may return collected data and/or analysis results to the flash controller 202.

In some embodiments, the failure detector module 204 may be a programmable system-on-a-chip (PSoC) that includes configurable integrated analog and digital peripherals and programmable routing and interconnects. Each of these configurable and programmable components may have different functions, and may work cooperatively to monitor the FTL failure for the flash packages 206, as discussed in more detail with reference to FIG. 3.

Figure 3:
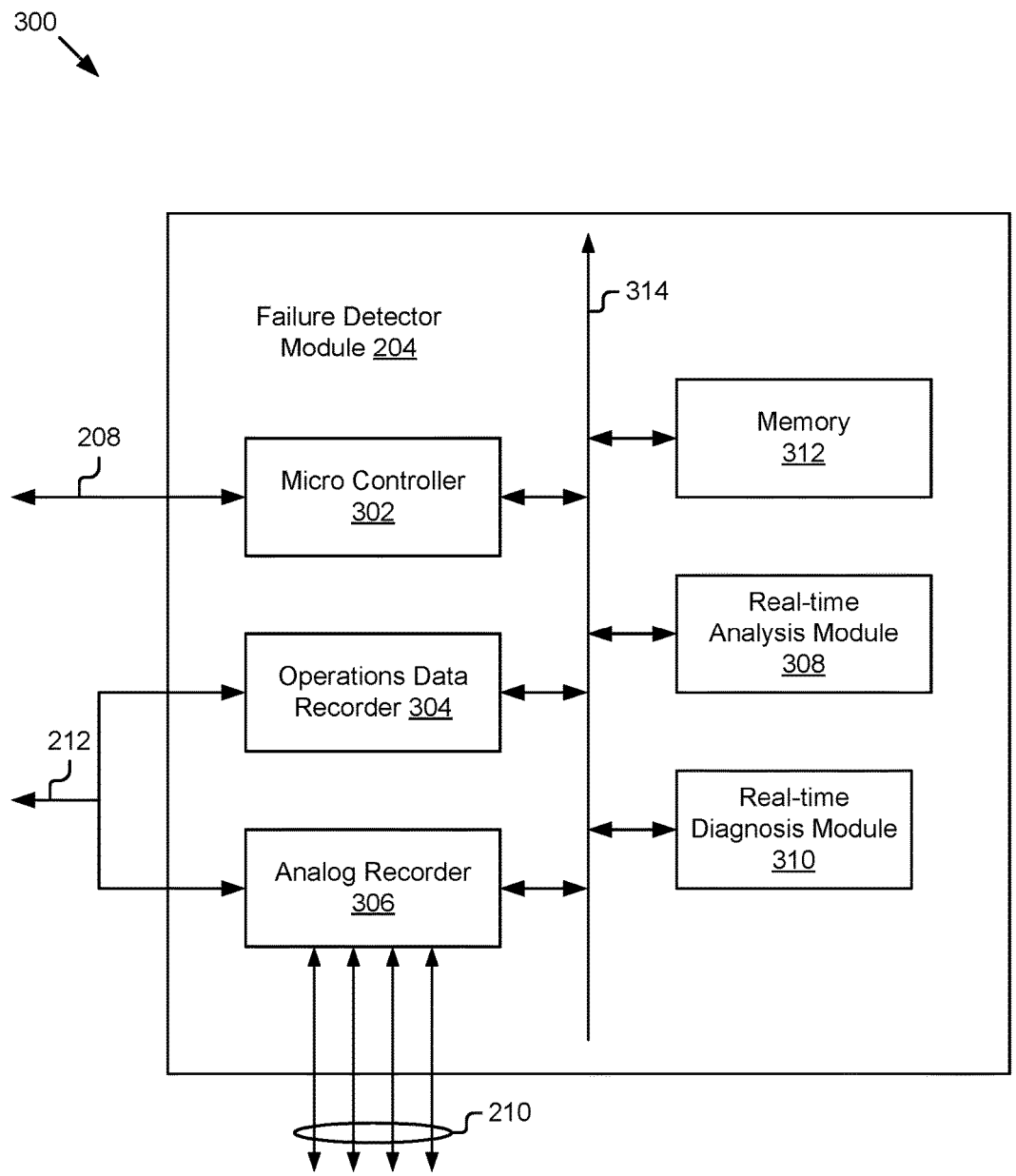
FIG. 3 is a block diagram illustrating an example failure detector module.

FIG. 3 is a block diagram illustrating an example failure detector module 204 according to some embodiments. As depicted in the figure, the failure detector module 204 may include a micro controller 302, an operations data recorder 304, an analog recorder 306, a real-time analysis module 308, a real-time diagnosis module 310, and a memory device 312, which may be electronically coupled by a communication bus 314 for cooperation and communication with each other. These components 302, 304, 306, 308, 310, and 312 may also be coupled to other entities (e.g. the flash controller 202, each flash package) of the flash blade 106 via signal lines 208, 210, and 212.

The micro-controller 302 includes software, code, logic, or routines that manages the monitoring process by the failure detector module 204. In some embodiments, the micro-controller 302 may receive commands from the flash controller 202 via the signal line 208 and direct other components of the failure detector module 204 via the communication bus 314 to perform specific instructions. For instance, the micro-controller 302 may direct the operations data recorder 304 to record operation data for a running flash package 206, and the analog recorder 306 to collect information about the environmental hardware conditions of the running flash package 206. In some embodiments, the micro controller 302 may store the received commands in the memory 312 for executing the commands in a later time.

The operations data recorder 304 includes software, code, logic, or routines that records operation data for a flash package 206. In some embodiments, the flash package 206 may receive operations from the flash controller 202. The operations may include reading, writing, erasing, and/or resetting operations. The operations data recorder 304 may then record data regarding these operations as software parameters. For instance, the operations data recorder 304 may record a success or fail for an operation, a time to accomplish the operation, a file size in the operation, a type of the operation, etc. In some embodiments, the operations data recorder 304 may collect the data information from the flash controller 202 via the communication bus 212, and/or send the recorded software parameters to the real-time diagnosis analysis module 310 and/or real-time analysis module 308. In some embodiments, the operations data recorder 304 may store the recorded software parameters in the memory 312 for immediate or later access. In some embodiments, the operations data recorder 304 may automatically record the operation data without receiving instructions from the micro controller 302.

The analog recorder 306 includes software and hardware logic that record hardware parameters regarding a flash package 206. The hardware parameters may include environmental data regarding the flash package 206, for example, temperature, humidity, power supply, voltage, frequency, or any other hardware parameters that may affect flash package operations. The analog recorder 306 may record data automatically or upon receiving instructions from the micro controller 302. In the illustrated implementation, the analog recorder 306 may record data for each flash package 206 independently through individual signal lines 210 to these flash packages 206. In some embodiments, the analog recorder 306 may include necessary sensors (not shown) to measure the environmental hardware parameters for each flash package 206. In some embodiments, the sensors may reside in other components of the flash node 106, and data may be transferred from the sensors to the analog recorder 306 through these components, as well as the communication buses 212 and/or 314. In some embodiments, the analog recorder 306 may send the collected data to other components of the failure detector module 204 for storage and/or further analysis, for instance to the memory 312.

The real-time analysis module 308 includes software, code, logic, or routines that performs real-time analysis for collected software and hardware parameters. The real-time analysis module 308 may perform the analysis for data received directly from the operations data recorder 304 and the analog recorder 306, or data retrieved from the memory 312. The analysis may include inspecting, cleaning, transforming, and modelling the data with the goal of discovering useful formation. For instance, for a write operation, the real-time analysis module 308 may analyze file size and processing speed to determining a likely time to finish the write operation, and/or to determine a corresponding threshold for this operation. In other instances, the real-time analysis module 308 analyzes the hardware parameters and the software parameters to determine a type of failure of the flash memory device, the specific device or controller that is failing.

The real-time diagnosis module 310 includes software, code, logic, or routines that performs diagnosis for a running flash package 206. In some embodiments, the real-time diagnosis module 310 may initiate a diagnose process to determine a likely cause of a FTL failure after receiving instructions from the micro controller 302. The real-time diagnosis module 310 may apply a series of heuristics to determine the likely cause. For instance, the real-time diagnosis module 310 may use a first heuristic to determine whether temperature of the running flash package 206 is within a predefined threshold, a second heuristic to determine whether time to write a file into the running flash package 206 is less than a predefined threshold, etc.

In some embodiments, the real-time diagnosis module 310 may retrieve data stored in the memory 312 or receive data from the real-time analysis module 308 to perform the diagnosis. In some embodiments, the real-time diagnosis module 310 may collect real-time data directly from the operations data recorder 304 and the analog recorder 306, thus only most recent data will be used for diagnosis. In some embodiments, both the real-time data and the stored data may be used for the analysis and/or diagnosis. After the diagnosis, the real-time diagnosis module 310 may further send a diagnosis report to the micro controller 302, and/or to other components of the flash node 106 (e.g. the flash controller 202) for further actions.

The memory 312 is an on-chip memory that stores software, logic, routines and codes, collected software and hardware parameters, and/or other necessary data (e.g. analysis results, diagnosis reports) for the failure detector module 204. Depending on configuration, the memory 312 may be a permanent, read-only memory that can only be programmed at a manufacturing site, or it may be a field-alterable flash or reusable read-only memory. In some embodiments, the memory 312 may include one or more of volatile memory and non-volatile memory such as one or more of a DRAM device, a static random access memory (SRAM) device, a discrete memory device (e.g., a PROM, FPROM, ROM). For instance, the memory 312 may be an electronically erasable programmable read-only memory (EEPROM) that can be programmed and erased in-circuit by applying special programming signals. Although only one memory unit is displayed in FIG. 3, it should be understood that there might exist more than one memory unit 312 in the failure detector module 204.

The failure detector module 204 is primarily described in the context of the flash node 106 with multiple flash packages 206. However, it should be understood that the failure detector module 204 may also exist in a variety of other contexts. For instance, the failure detector module 204 may exist in a single memory unit (e.g. a SD card, flash drive, memory chip, etc.) in any host computing system or device for failure detection and analysis. For this reason, a general "flash memory device" may be used hereafter to refer a "flash package" 206, a flash memory unit in a flash array, or any other single memory unit.

Figure 4:
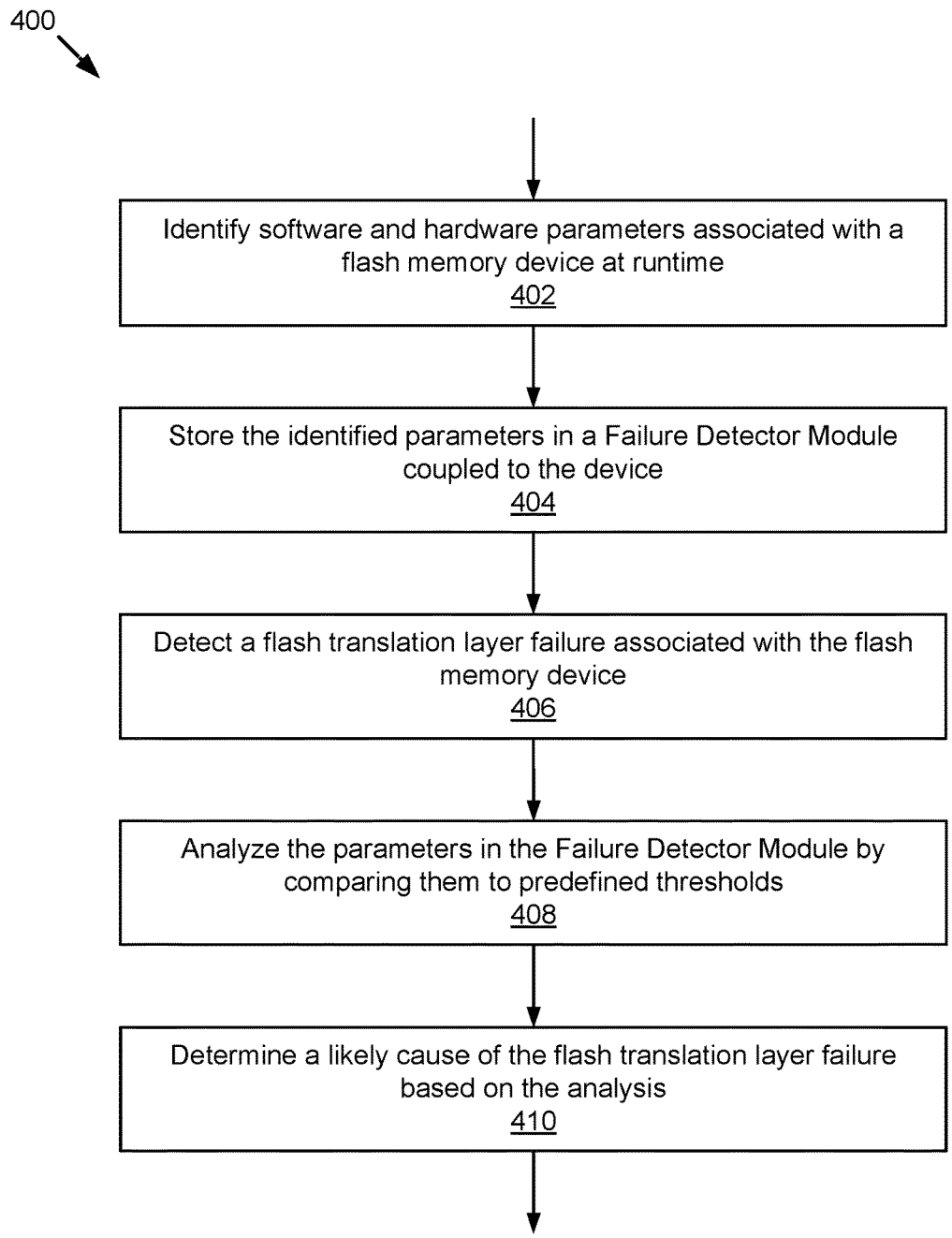
FIG. 4 is a flow chart of an example general method for monitoring a flash translation layer failure associated with a flash memory device.

FIG. 4 depicts an example general method for monitoring a FTL failure for an associated flash memory device (e.g., the flash package 206) according to some embodiments. The method 400 starts by identifying software and hardware parameters associated with the flash memory device at runtime at block 402. The identified parameters may include any software and hardware parameters that affect and/or monitor operations of the flash memory device. The hardware parameters may include temperature, humidity, power supply, voltage, frequency, or any other environmental hardware parameters that likely affect essential operation of the flash memory device. The software parameters may include parameters related to general operations in the flash memory device, such as a time to read a file from, a time to write a file into, a time to erase a file in the flash memory device, a time to rest the flash memory device, etc.

In some embodiments, the failure detector module 204 may be responsible for identifying the software and hardware parameters. The failure detector module 204 may receive protocol commands from the flash controller 202, and execute the received commands by instructing the operations data recorder 304 to identify the software parameters and the analog recorder 306 to identify hardware parameters. Each identified parameter may carry a timestamp, which may be determined based on the time when the parameter is identified or received by the failure detector module 204. The timestamp may provide a tag to allow retrieval of a software and hardware parameter for a specific moment (e.g. at a moment of a FTL failure) for analysis. The following table provides a list of example protocol commands (in the left column) that the failure detector module 204 may receive and an outcome for each command (in the right column) according to some embodiments.

| | |
|---|---|
| i) START_MONITOR | The FTL starts debugging after sending the START_MONITOR command. The FTL also sends to a flash memory device, which needs to be debugged along with the START_MONITOR command. |
| ii) GET_VOLTAGE | The FTL sends a GET_VOLTAGE command and the failure detector module returns the voltage of the flash memory device. |
| iii) GET_POWER | The failure detector module returns the power of the flash memory device. |
| iv) GET_TEMP | The failure detector module returns the temperature of the flash memory device. |
| v) CHECK_RDBSY | The failure detector module checks the RDBSY (Ready/Busy) signal for a given operation. |
| vi) CHECK_ERASE \| CHECK_RDBSY | This command makes the failure detector module ready to measure the RDBSY signal for an ERASE operation. If the failure detector module does not see any toggling on the RDBSY signal after a certain time, it returns a RDBSY_ERR response. |
| vii) CHECK_WRITE \| CHECK_RDBSY | This command makes the failure detector module ready to measure the RDBSY signal for a WRITE operation. If the failure detector module does not see any toggling on the RDBSY signal after a certain time, it returns a RDBSY_ERR response. |
| viii) CHECK_READ \| CHECK_RDBSY | This command makes the failure detector module ready to measure the RDBSY signal for a READ operation. If the failure detector module doesn't see any toggling on the RDBSY signal after a certain time, it returns a RDBSY_ERR response. |
| ix) CHECK_RESET \| CHECK_RDBSY | This command makes the failure detector module ready to measure the RDBSY signal for a RESET operation. If the failure detector module doesn't see any toggling on the RDBSY signal after a certain time, it returns a RDBSY_ERR response. |

According to the table, the START MONITOR command may instruct the failure detector module 204 to begin monitoring a flash memory device by executing the remaining commands in the table. The monitoring process may be triggered under various conditions depending on the configuration of the flash node 206 in the flash array 100. In some embodiments, the monitoring process may start at a moment when a host computing system turns on, and the failure detector module 204 may consistently monitor the operation of the flash memory device until the host computing system turns off. In some embodiments, the monitoring process may be triggered to start only at certain circumstances. For instance, the monitoring process for the flash memory device may be triggered to start at the moment a FTL failure associated with the flash memory device occurs and/or is detected. In some embodiments, a user may actively start and/or terminate the monitoring process. The user may use a user-interface in a host computing system (not shown) to select when and which flash memory device(s) to start to monitor.

At block 404, the method 400 may store the identified software and hardware parameters. In some embodiments, the parameters may be stored in the memory 312 of the failure detector module 204. The memory 312 may include one or more EEPROMs. Each EEPROM may have a certain number of sectors for storing the identified parameters. In some embodiments, an EEPROM may contain a plurality of sequential sectors, which store the data according to the time the software and hardware parameters are received. Since each identified software and hardware has a timestamp, the EEPROM with the sequential sectors may organize the time stamped software and hardware parameters in a manner that allows easier data retrieval, erasing, update, etc.

At block 406, the method 400 may detect a FTL failure associated with a flash memory device at runtime. The FTL 214 is responsible for essential functions in associated flash memory devices, such as a mapping process. In some embodiments, a FTL failure may occur when the FTL 214 cannot map a logical address to a physical address, which may be reflected by a failed I/O operation in the associated flash memory device. Therefore, a FTL failure may be detected by a failed I/O operation in an associated flash memory device. In some embodiments, a FTL failure may be detected by multiple failures of I/O operations in the associated flash memory device.

In some embodiments, the FTL 214 may further confirm the detected FTL failure in the associated flash memory device. The FTL 214 may perform additional I10 operations using pre-selected reliable files, to ensure the failed I/O operation is not due to broken files in the I/O operation. For instance, the FTL 214 may retrieve a reliable file from a storage device other than the associated flash memory device (e.g. the memory 312 of the failure detector module 204), and try to write the retrieved file into the associated flash memory device. For another instance, the FTL 214 may try to directly read another reliable file pre-stored in the associated flash memory device. If the FTL 214 still finds failed I/O operations in the flash memory device, the FTL 214 may confirm the detected FTL failure for the associated flash memory device.

At block 408, the method 400 may analyze the stored software and hardware parameters for the associated flash memory device. The failure detector module 204 may analyze the stored parameters by first retrieving the software and hardware parameters for the associated flash memory device. In some embodiments, the failure detector module 204 may retrieve the stored parameters based on the timestamps of these parameters. For instance, the failure detector module 204 may first determine a specific time point when a FTL failure is first detected, then retrieve the stored parameters with timestamps matching the specific time point.

In some embodiments, the failure detector module 204 may retrieve software and hardware parameters for a series of time points around the time point related to the detected FTL failure. For instance, the failure detector module 204 may retrieve software and hardware parameters having timestamps within a certain period of the time point related to the FTL failure (e.g. within 10 secs, 30 secs, 1 min, 5 min, etc.). The failure detector module 204 may determine a tendency for one or more of the software and hardware parameters based on the retrieved series of software and hardware parameters. For instance, the failure detector module 204 may determine a tendency of a steady increasing temperature, or a tendency of a vibrating voltage right before the detected FTL failure, etc. The determined tendencies may provide additional information in determining a likely cause of the detected FTL failure.

In some embodiments, the failure detector module 204 may analyze the retrieved parameters by comparing them to predefined thresholds. The analysis may include first determining a corresponding predefined threshold for each parameter. For instance, for a software parameter, the method 400 may first determine an operation type, file size, processor frequency, and other possible factors that likely affect operation speed, and determine a corresponding threshold based on these factors. In some embodiments, an operation for the monitoring process may use a pre-selected file with a fixed size in the parameter-identifying process at block 402; and thus, the thresholds for each software parameter may be predetermined. In some embodiments, a predefined threshold may be a broad one that covers operations of various file size, processing speed, etc., and thus these factors may not necessarily be considered in determining the corresponding threshold. Upon determination of the corresponding thresholds, the method 400 may proceed to compare the identified parameters with the predefined thresholds to determine a likely cause of the detected FTL failure, as discussed in more detail with reference to FIG. 6.

At block 410, the method 400 may determine a cause of the detected FTL failure based on the analysis. The method 400 may determine whether the detected FTL failure is due to a failure of the associated flash memory device itself, or environmental hardware, or due to the other software and hardware bugs. Additionally, the method 400 may also send a signal indicating the cause of failure or store the cause of failure in memory 312 or other predetermined location. The failure detector module 204 may determine a cause based on the analysis of the collected software and hardware parameters, as discussed in more detail with reference to FIG. 6.

Figure 5:
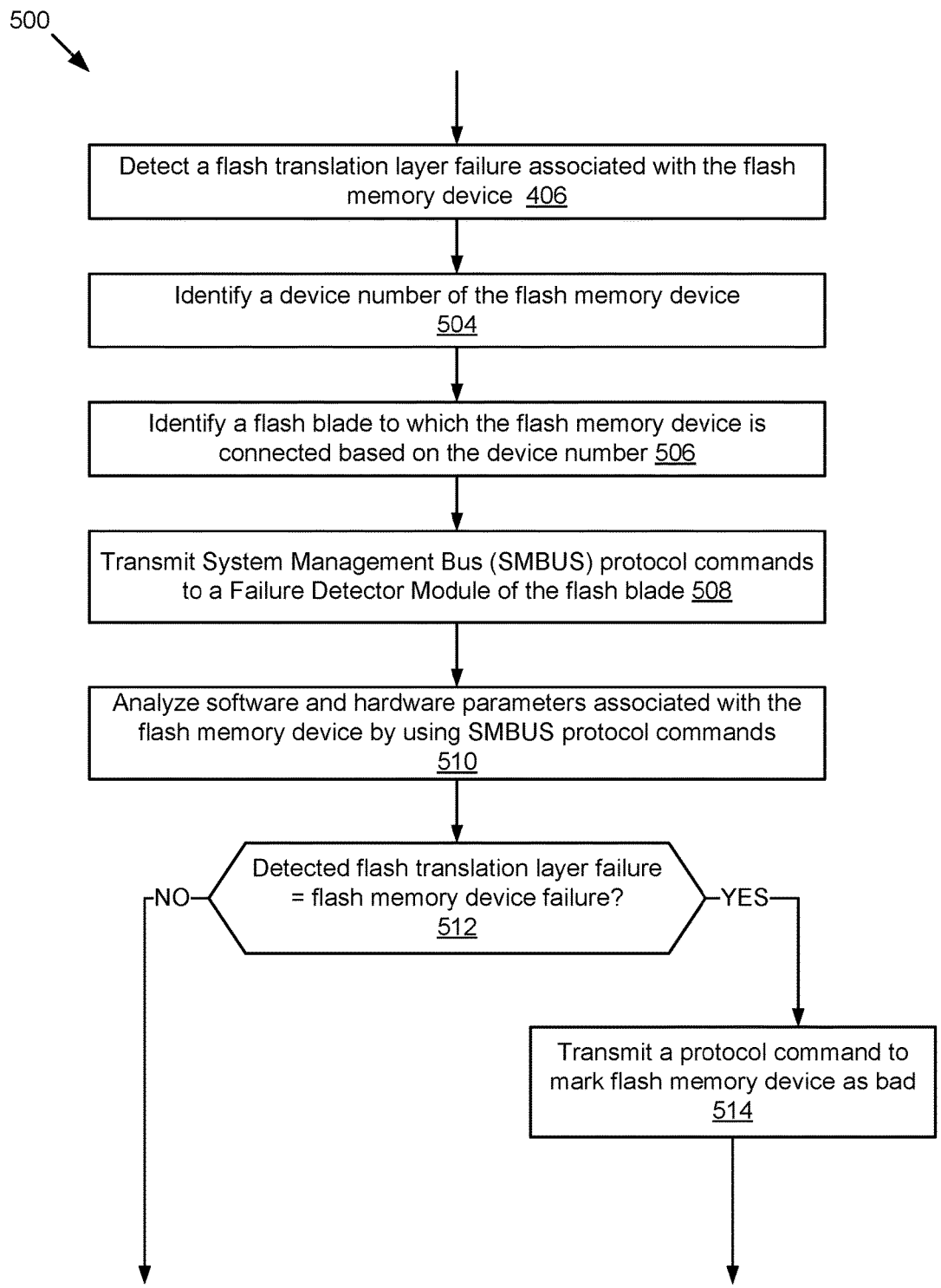
FIG. 5 is a flow chart of an example alternative method for monitoring a flash translation layer failure associated with a flash memory device.

FIG. 5 depicts another example method for monitoring a FTL failure associated with a flash memory device according to some embodiments. In some embodiments, a monitoring process might be triggered to start only after a FTL failure is detected. The method 500 starts by detecting a FTL failure at block 406. Once the FTL failure is detected, the associated flash memory device may be released from I/O path for further file system operations, but other connections may remain untouched for further analysis and diagnosis of likely causes of the detected FTL failure.

At block 504, the method 500 may identify a device number for the flash memory device associated with the detected FTL failure. The method 500 may identify the device number based on a unique identifier for the associated flash memory device in the flash array 100. In some embodiments, a data management system may assign an identifier for each flash memory device in the system. For instance, the management system may generate an instance identifier, such as a logic unit number (LUN), for each memory unit in a memory device tree. An instance identifier may correspond to a flash memory device (e.g., a flash package) in the device tree (e.g., a flash array) and uniquely identifies a flash memory device (e.g., a flash package).

In some embodiments, the associated flash memory device may itself contain a unique identifier that can report to and/or be recognized by a data management system. For instance, the flash memory device may have a serial number that is available as a part of a device's inquiry data that can be queried by an initiator of the system, or it may contain a recognizable Device Unique Identifier (DUID) that remains the same under different operating systems, or different locations, or even different I/O paths. It should be understood that there might exist other approaches for unique identifier assignment, which are also contemplated and fall within the scope of the present disclosure.

At block 506, the method 500 may identify a corresponding flash blade 106 to which the associated flash memory device is connected. Due to different architectures and configurations, the method 500 may use different approaches to identify the corresponding flash blade 106. In some embodiments, the corresponding flash blade 106 may be identified based on a device tree structure of the flash array 100. The branches in the device tree structure may provide a direct connection for the associated flash memory device to the corresponding flash blade 106, thus allow easy identification of the corresponding flash blade 106. In some embodiments, the corresponding flash blade 106 may be identified based on unique identifiers, which may include an identifier for the flash blade 106 and sub-identifiers for flash memory devices to which the flash blade 106 is connected. The sub-identifiers may be extended from the identifier for the flash blade 106, which allows easy identification of the corresponding flash blade 106 by matching the first part of the extended identifiers to the identifier for the flash blade 206. Other approaches currently available or to-be-developed to identify the corresponding flash blade 106 are also contemplated here.

At block 508, the method 500 may transmit one or more SMBUS protocol commands from the flash controller 202 to the failure detector module 204 in the identified flash blade 106. The flash controller 202 may serve as a SMBUS master to issue commands, while the failure detector module 204 may serve as a SMBUS slave to receive and respond to the commands. The transmitted SMBUS protocol commands may instruct the SMBUS slave to collect necessary software and hardware parameters to diagnose the likely cause of the detected FTL failure for the associated flash memory device, as listed in the above table. In some embodiments, the SMBUS protocol commands may carry a specific identifier (e.g. a slave address) to instruct the failure detector module 204 to collect and analyze only software and hardware parameters for the specific flash memory device matching the identified device number at block 504.

At block 510, the method 500 may execute the received protocol commands to collect and analyze software and hardware parameters for the associated flash memory device. Since the protocol commands are executed after the detected FTL failure, only one set of software and hardware parameters may be collected for analysis, and timestamps for these parameters may not reflect the time point of the detected FTL failure.

At block 512, the method 500 may determine whether the detected FTL failure is a flash memory device failure, or some other type, as discussed with reference to FIG. 6. If the FTL failure is not a flash memory device failure the method 500 is complete. However, if the FTL failure is a flash memory device failure, the method 500 proceeds to block 514.

At block 514, the method 500 may transmit a new protocol command to mark the flash memory device as non-operational (bad) if the detected FTL failure is a flash memory device failure. The new protocol command may include instructions instructing the flash memory device to turn on and/or switch a light in the device to mark it as bad. The marked-as-bad device may then be hot-swapped and replaced by a client or end-user without affecting storage function of the flash array 100. Depending on architecture of the associated flash memory device, the new protocol command may vary from a very simple "LED_ON" command to more complicated commands, such as "RED_LED_ON," "GREEN_LIGHT_OFF & RED_LIGHT_ON," etc. However, if the detected FTL failure is not the flash memory device failure, the new command will not be issued and the light indicator will not be switched. The method 500 may then look for other likely causes for the detected FTL failure, as discussed with reference to FIG. 6.

Figure 6:
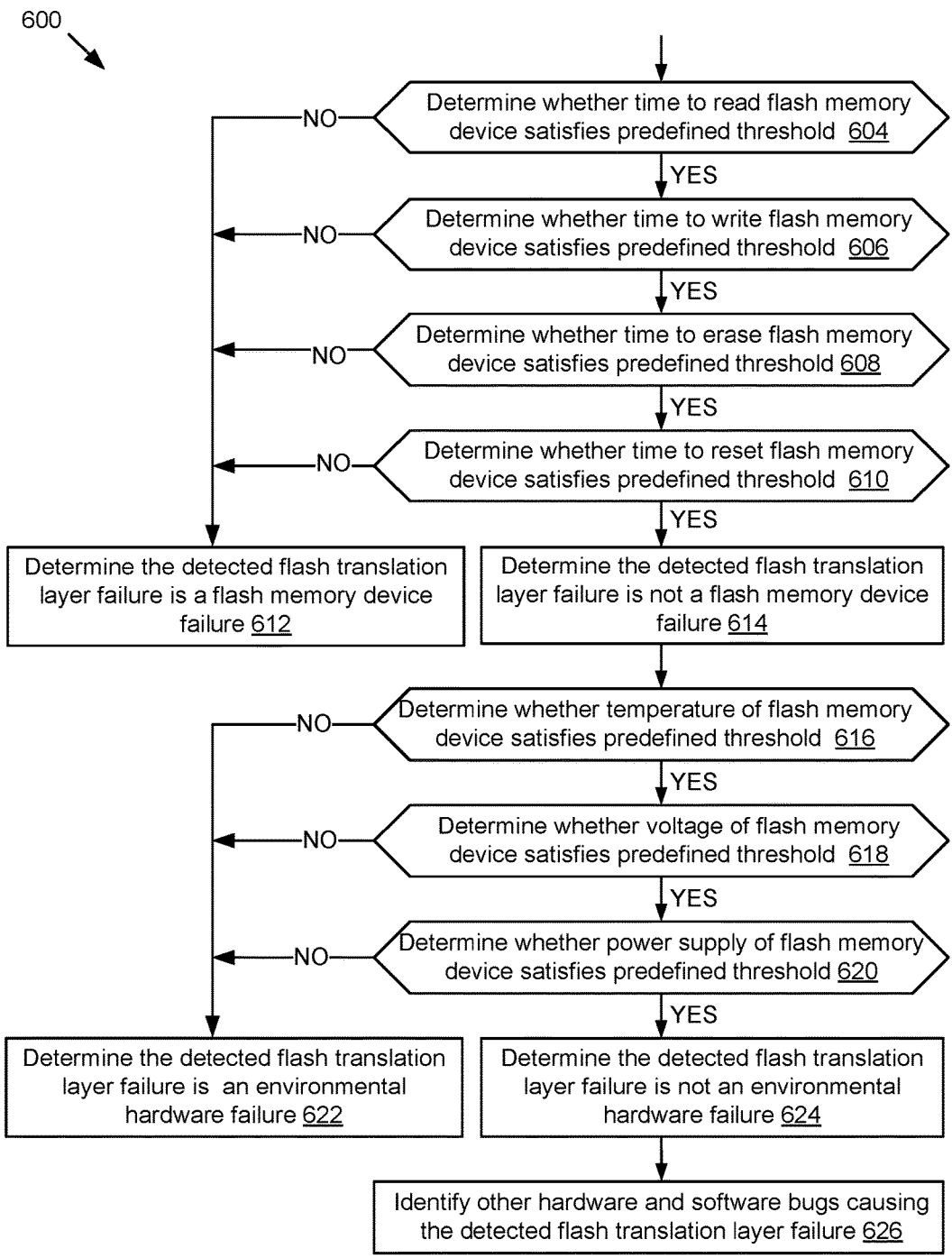
FIG. 6 is a flow chart of an example method for analyzing software and hardware parameters to determine the cause of a flash translation layer failure.

FIG. 6 depicts an example method 600 to determine a likely cause of the detected FTL failure among many possibilities. According to some embodiments illustrated in FIG. 6, the method 600 may start by first determining whether the detected FTL failure is a flash memory device failure. If not, the method 600 may then determine whether the detected FTL failure is an environmental hardware failure. However, it should be understood that the method 600 may also first determine a likely environment hardware failure, then a possibility of the flash memory device failure according to another embodiment. In both embodiments, if neither the flash memory device failure nor the environmental hardware failure exists, the method 600 may determine the detected FTL failure is due to other software and/or hardware bugs that likely affect flash memory device operations. Similarly, the order of the steps 604, 606, 608 and 610 of method may be performed in other orders than that shown and described with reference to FIG. 6 and remain within the scope of the present disclosure. Likewise, steps 616, 618 and 620 of method may be performed in other orders than that shown and described with reference to FIG. 6.

At block 604, the method 600 may first determine whether the detected FTL failure is a flash memory device failure by determining whether time to read a file from the associated flash memory device satisfies a predefined threshold. In some embodiments, time to read a file from the flash memory device may be obtained from identified software parameters from the "CHECK_READ|CHECK_RDBSY" command. Many factors may affect time to read a file from a flash memory device, such as operating system, cache size, seek latencies, size of the file, record size, etc. By considering these factors, the method 600 may identify a corresponding predefined threshold for the identified software parameter regarding the READ operation. Time for the READ operation identified from the CHECK_READ|CHECK_RDBSY command may then be compared to the corresponding predefined threshold to determine whether the FTL failure is a flash memory device failure. If the time to read a file from the associated flash memory device does not satisfy a predefined threshold, then the method continues to block 612, otherwise the method 600 continues to block 606.

At block 606, the method 600 may determine whether time to write a file into the associated flash memory device satisfies a predefined threshold. Similar to the above READ operation, time for a WRITE operation may also vary depending on many factors, and thus the method 600 may need to consider these factors to identify a corresponding predefined threshold for the WRITE operation. It may be noted that the corresponding predefined threshold for the WRITE operation may be different from that of the READ operation, as a write operation generally takes longer time than a read operation for the files of the same size. Once the corresponding predefined threshold for the WRITE operation is determined, it may be compared to the identified software parameter from the CHECK_WRITE|CHECK_RDBSY command for failure analysis. If the time to write a file from the associated flash memory device does not satisfy a predefined threshold, then the method 600 continues to block 612, otherwise the method 600 continues to block 608.

At block 608, the method 600 may determine whether time to erase a flash block in the associated flash memory device satisfies a predefined threshold. An erase operation may be used for garbage collection and reclaim of a flash block with idle files. Flash memory devices may have different size of flash blocks, depending on vendors for these devices. Therefore, different flash memory devices may have different block erase times. For instance, a first flash memory device from a first vendor may have a block size of 128 kb and a block erase time of ~0.7 s, while a second flash memory device from a second vendor may have a block size of 16.5 kb and a block erase time of ~2 ms. Therefore, the method 600 may rely on specifications from vendors to determine a corresponding predefined threshold for the ERASE operation, and compare it to the identified software parameter from the CHECK_ERASE|CHECK_RDBSY command for failure analysis. If the time to erase a file from the associated flash memory device does not satisfy a predefined threshold, then the method 600 continues to block 612, otherwise the method 600 continues to block 610.

At block 610, the method 600 may determine whether time to reset the associated flash memory device satisfies a predefined threshold. For a flash memory device, a reset operation may reset the device to a power-up state, or restore operation data to a previously existing condition. A reset operation may include a hardware reset, a software reset, a XIP (execution-in-place) reset, and/or a protocol reset depending on configuration of the flash memory device. Different resets might need different time to accomplish. The failure detector module 204 may select one among the above various options when executing the CHECK_RESET|CHECK_RDBSY command. For instance, the failure detector module may perform a hardware power-up reset when executing the command. Once the reset option is determined, a corresponding predefined threshold may be also determined, and be used to compare identified the software parameter from the CHECK_RESET|CHECK_RDBSY command for failure analysis. If the time to reset the associated flash memory device does not satisfy a predefined threshold, then the method 600 continues to block 612, otherwise the method 600 continues to block 614.

At blocks 604, 606, 608, and 610, the four different software parameters are analyzed in an order according to some embodiments. It should be understood that the four software parameters may be analyzed in other orders. In some embodiments, the four software parameters may be analyzed in a random order. For instance, the method 600 may also first determine whether time for an erase operation satisfies a predefined threshold, or time for a reset operation satisfies a predefined threshold, or time for a write operation satisfies a predefined threshold. In some embodiments, the four software parameters may be analyzed in an order based on likely failures for each operation. For instance, there might be more likely failures in erase operations and write operations due to higher voltages applied to these operations, and thus an erase or write operation may be analyzed earlier than a read or reset operation. However, for whatever an order used in the analysis of the four software parameters, outcome of the analysis may not necessarily be affected.

At block 612, the method 600 may determine the detected FTL failure is a flash memory device failure if any of the above four identified software parameters does not satisfy its corresponding predefined threshold. If the detected FTL failure is determined to be the flash memory device failure, the associated flash memory device may be marked as bad, as described with reference to block 514. In some embodiments, other devices may be notified, messages may be sent, or fields or storage locations may be updated to indicate device is bad.

However, if all of the above four software parameters do satisfy their corresponding predefined thresholds, the method 600 may determine the detected FTL failure is not a flash memory device failure, as shown at block 614. The method 600 may then analyze other likely causes of the detected FTL failure, including environmental hardware failures, such as a failure in temperature, voltage, or power supply, as described in the next.

At block 616, the method 600 may determine whether the detected FTL failure is an environmental hardware failure by first determining whether temperature of the associated flash memory device satisfies a predefined threshold. Operating temperature of a flash memory device may have great impact on operations and endurance of the device. The higher the temperature a flash memory device experiences, the greater the acceleration of charge de-trapping mechanisms that could lead to random data bit failures in write or erase operations. Flash memory devices from many vendors may support "Industrial Temperature" (typically 40° C. to 85° C.) operations, and a temperature too high or too low may cause failed write or erase operations. To determine a corresponding predefined threshold, the method 600 may rely on specifications from vendors, or the "Industrial Temperature" if no specification regarding temperature thresholds is provided. The determined threshold may then be compared to the hardware parameter from the GET_TEMP command to determine whether the detected FTL failure is an environmental hardware failure. If the temperature of the associated flash memory device does not satisfy a predefined threshold, then the method 600 continues to block 622, otherwise the method 600 continues to block 618.

At block 618, the method 600 may determine whether voltage of the associated flash memory device satisfies a predefined threshold. A flash memory device stores data information by removing or trapping electrons on a floating gate of a memory element, which is achieved by applying voltages between a control gate and an electron source or drain in the element. Different flash memory device operations may have different voltages. For instance, for an erase operation, a voltage in the range of −9 v to −12 v may be needed in the control gate; and for a write operation, a voltage of around 12 v may be needed; while for a read operation, a voltage of just around 5 v may be needed. The method 600 may rely on timestamps in the software and hardware parameters to identify a corresponding operation related to the moment when the "GET_VOLTAGE" command is executed, and determine a corresponding predefined threshold based on a type of the identified operation. Once determined, the corresponding threshold may then be compared to the hardware parameter from the "GET_VOLTAGE" command for failure analysis. If the voltage of the associated flash memory device does not satisfy a predefined threshold, then the method 600 continues to block 622, otherwise the method 600 continues to block 620.

At block 620, the method 600 may determine whether power supply for the associated flash memory device satisfies a predefined threshold. The various power supplies for the associated flash memory device, or even the entire system, may be monitored constantly, at selected specified times, or at idle time by detecting supply current at the associated flash memory device, or each part of the system. For example, the core supply current is measured and recorded at idle time. And, then constantly monitored during various operations to see if it crosses or satisfies a threshold. Supply current at the associated flash memory device, or each part of the system, may be affected by its own internal activity. For instance, peak performance activity with excessive operations in a short period inside the flash memory device may draw an enormous amount of power in the short period, which may cause the supply current in the flash memory device to satisfy or cross above a tolerance level. The supply current at the associated flash memory device may also be affected by other external factors. Power is supplied to the associated flash memory device as a directed current (DC) by an A/D converter, and may be provided to the flash memory device through a pin that connects the flash memory device to a power source. In some embodiments, the pin may become loose or even break due to wearing out, external force or other reasons, and thus connections between a power supply source and the associated flash memory device may not be firmly established or maintained. In some embodiments, an original alternative current (AC) power source for the A/D converter may experience problems, such as a power surge, which may sequentially cause the power supply for the associated flash memory device out of a tolerance level. For any conditions, the hardware parameter from the "GET_POWER" command may be compared to a predefined threshold for a power source of the flash memory device to determine whether the FTL failure is due to an anomaly in the power supply. If the power supply of the associated flash memory device does not satisfy a predefined threshold, then the method 600 continues to block 622, otherwise the method 600 continues to block 624.

It should be understood that the above three hardware parameters at blocks 616, 618, and 620 are not all-inclusive, and other environmental hardware parameters (e.g. humidity, clock frequency, etc.) that may affect flash memory device operations are also contemplated and fall within the scope of the present disclosure.

If any one of the above environmental hardware parameters does not satisfy the predefined thresholds, the method 600 may determine that the cause of the detected FTL failure is due to an environmental hardware failure in the associated flash memory device, as shown in block 622. In some embodiments, an environmental hardware failure may require that two or more predefined thresholds are not satisfied.

However, if the above-analyzed environmental hardware parameters satisfy the predefined thresholds for the associated flash memory device, the method 600 may determine that the environmental hardware parameters do not contribute to the detected FTL failure, as shown in block 624.

At block 626, the method 600 may determine that other software and/or hardware bugs likely cause the detected FTL failure if the environmental hardware and the flash memory device itself are not at fault. The other software and/or hardware bugs may include a broken communication bus 212, an interrupted interface between the flash blade 206 and the processor 102, software bugs in a programmed firmware in the flash controller 202 or FTL 214, or even other bugs in hardware, DOS system, and operation system of the host computing system, etc. The method 600 may determine whether the other software and hardware bugs contribute to the detected FTL failure by analyzing software and hardware parameters collected for other flash memory devices in the same flash node and/or the same flash array, as other flash memory devices in the flash node or flash array may also be affected by these software and hardware bugs.

Figure 7:
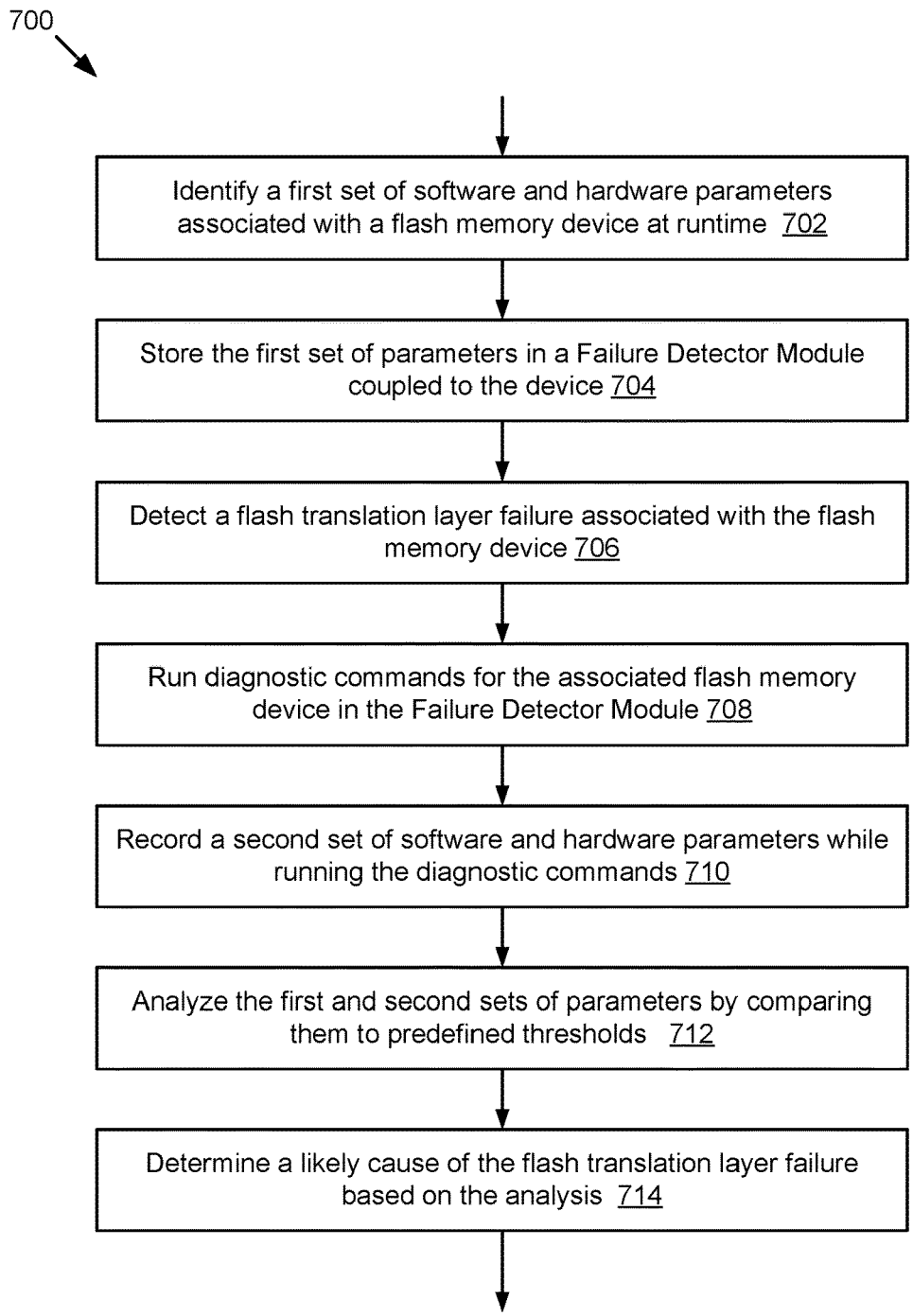
FIG. 7 is a flow chart of an example alternative method for monitoring a flash translation layer failure using two sets of parameters.

While one set of software and hardware parameters may provide necessary information in determining the cause of the detected FTL failure, it may be advantageous to have two or more sets of software and hardware parameters to confirm or reinforce the determined cause of the detected FTL failure. FIG. 7 provides an example method for detecting a FTL failure and determining a cause using two sets of parameters. At block 702, a first set of software and hardware parameters associated with a flash memory device may be identified and collected at runtime. The first set of software and hardware parameters at runtime may include timestamps to allow later retrieval of software and hardware parameters for the detected FTL failure, as discussed with reference to block 402. At block 704, the collected first set of parameters may then be stored in the failure detector module 204.

At block 706, the method 700 may detect a FTL failure associated with flash memory device.

At block 708, the method 700 may additionally run diagnosis commands for the associated flash memory device after the detection of the FTL failure. A second set of software and hardware parameters may be then collected. In some embodiments, the second set of parameters may be collected similarly as discussed in FIG. 5. In some embodiments, the second set of parameters may be collected after hot-swapping the associated flash memory device and placing it into a different flash node, flash array or host computing system from where the first set of parameters is collected. For instance, the second set parameters may be collected at a system related to a manufacturer, vendor for the associated flash memory device, or from a third party. Aiming to diagnose the likely causes of FTL failures at different flash nodes, the host computing system may be a specially designed system with well-controlled environment and/or hardware components to limit likely environmental hardware failures, as well as other software and hardware bugs.

At block 710, the method 700 may record a second set of software and hardware parameters. The second set of software and hardware parameters may be recorded by the operations data recorder 304 and the analog recorder 306 in the failure detector module 204, or by other similar components for failure monitor and analysis if collected in different flash node, flash array, or host computing system. The recorded second set of parameters may be stored in the memory 312 of the failure detector module 204, or other similar data-saving components.

At block 712, the method 700 may compare both the first and second sets of parameters with predefined thresholds related to these parameters. The two sets of parameters retrieved from the memory 312 and/or the other data-saving components may be pooled together for comparison, or each set of parameters may be compared to corresponding predefined thresholds. The corresponding predefined thresholds may be different for the two set of parameters due to different running environment. For instance, different processors from different host computing systems might have different processing speed, which may affect a speed of a reading, writing, erasing, or resetting process.

At block 714, the method 700 may determine the likely cause of the detected FTL failure associated with the flash memory device. The comparison of the two sets of parameters with predefined thresholds may provide additional information compared to only one set of parameters in determining the likely cause of the detected FTL failure. For instance, while the first set of parameters may suggest a likely environmental parameter failure, the second set of parameters obtained from a well-controlled environment may confirm the suggested likely cause of the failure from the first set by not detecting a FTL failure after environmental change in the second set of parameters. This comparison using two sets of parameters may provide more convincing answers to clients when drawing a conclusion of the likely cause in the failure analysis.

Systems and methods for determining a likely cause of a FTL failure for an associated flash memory device have been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above are primarily in the context of flash arrays. However, the disclosed technologies apply to other data storage devices.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system for detecting a memory failure in a run-time environment, the system comprising:
    a flash memory device configured to store data, the flash memory device having inputs and outputs;
    a controller coupled for communication with the flash memory device and configured to:
        control reading of data from the flash memory device and writing data to the flash memory device;
        identify a device number of the flash memory device in response to detecting the memory failure in the run-time environment; and
        identify a flash blade to which the flash memory device is connected based on the device number;
    a failure detector module coupled for communication with the flash memory device and the controller, the failure detector module configured to:
        monitor the controller and the flash memory device to collect a hardware parameter and a software parameter;
        receive a system management bus protocol command that includes instructions to perform failure analysis for the memory failure detected in the run-time environment;
        perform the failure analysis for the memory failure by comparing the software parameter and the hardware parameter to predefined thresholds; and
        determine a cause of the memory failure based on the performed analysis.

2. The system of claim 1 wherein the failure detector module further comprises a real-time analysis module, the real-time analysis module coupled to receive the hardware parameter and the software parameter and configured to analyze the hardware parameter and the software parameter to determine a type of failure of the flash memory device or the controller.

3. The system of claim 1 wherein the failure detector module further comprises a real-time diagnosis module coupled to receive the hardware parameter and the software parameter and configured to determine a likely cause of a failure of a running flash memory device by applying a series of heuristics.

4. The system of claim 1 further comprising an operations data recorder coupled to receive one or more operations sent by the controller to the flash memory device, the operations data recorder configured to store the one or more operations as software parameters in the failure detector module.

5. The system of claim 1 wherein the software parameter is one from the group of a time to read a first file from the flash memory device, a time to write a second file into the flash memory device, a time to erase a flash block of the flash memory device, and a time to reset the flash memory device.

6. The system of claim 1 further comprising an analog recorder coupled to receive signals from the flash memory device, the analog recorder configured to store the signals as hardware parameters in the failure detector module, and wherein the hardware parameter is one from the group of a temperature, a humidity, a voltage, a power supply, and a clock frequency related to the flash memory device.

7. The system of claim 1 wherein the failure detector module is a programmable system-on-chip in a flash node, the programmable system-on-chip including a plurality of independent pins for connecting to each of a plurality of flash packages in the flash node.

8. A computer-implemented method comprising:
identifying a software parameter and a hardware parameter associated with a flash memory device at runtime;
storing the software parameter and the hardware parameter in a failure detector module coupled to the flash memory device;
detecting a flash translation layer failure associated with the flash memory device;
identifying a device number of the flash memory device;
identifying a flash blade to which the flash memory device is connected based on the device number;
transmitting a system management bus protocol command to the failure detector module;
performing analysis of the software parameter and the hardware parameter stored in the failure detector module including comparing the software parameter and the hardware parameter to predefined thresholds; and
determining a cause of the flash translation layer failure based on the performed analysis.

9. The computer-implemented method of claim 8, wherein determining the cause of the flash translation layer failure based on the performed analysis is a flash memory device failure, and the method further comprises:
transmitting a protocol command to the failure detector module;
implementing the protocol command to mark the flash memory device as non-operational; and
releasing the flash memory device from further file system operations.

10. The computer-implemented method of claim 8, wherein performing analysis of the software parameter and the hardware parameter includes:
running a diagnostic command in the failure detector module for the flash memory device;
recording a second software parameter and a second hardware parameter based on running the diagnostic command;
performing additional analysis of the second software parameter and the second hardware parameter by comparing them to predefined thresholds; and
wherein determining the cause of the flash translation layer failure is also based on the additional analysis.

11. The computer-implemented method of claim 8, wherein the software parameter is one from the group of a time to read a first file from the flash memory device, a time to write a second file into the flash memory device, a time to erase a flash block of the flash memory device, and a time to reset the flash memory device.

12. The computer-implemented method of claim 8, wherein the hardware parameter is one from the group of a temperature, a humidity, a voltage, a power supply, and a clock frequency related to the flash memory device.

13. The computer-implemented method of claim 8, wherein the cause of the flash translation layer failure is one from the group of a flash memory device failure, an environmental hardware failure, a software bug, and a hardware bug.

14. A system comprising:
means for identifying a software parameter and a hardware parameter associated with a flash memory device at runtime;
means for storing the software parameter and the hardware parameter in a failure detector module coupled to the flash memory device;
means for detecting a flash translation layer failure associated with the flash memory device;
means for identifying a device number of the flash memory device;
means for identifying a flash blade to which the flash memory device is connected based on the device number;
means for transmitting a system management bus protocol command to the failure detector module;
means for performing analysis of the software parameter and the hardware parameter stored in the failure detector module including means for comparing the software parameter and the hardware parameter to predefined thresholds; and
means for determining a cause of the flash translation layer failure based on the performed analysis.

15. The system of claim 14, further comprising:
means for transmitting a protocol command to the failure detector module;
means for implementing the protocol command to mark the flash memory device as non-operational; and
means for releasing the flash memory device from further file system operations.

16. The system of claim 14, further comprising:
means for running a diagnostic command in the failure detector module for the flash memory device;
means for recording a second software parameter and a second hardware parameter based on running the diagnostic command;
means for performing additional analysis of the second software parameter and the second hardware parameter by comparing them to predefined thresholds; and
wherein the means for determining the cause of the flash translation layer failure is also based on the additional analysis.

17. The system of claim 14, wherein the software parameter is one from the group of a time to read a first file from the flash memory device, a time to write a second file into the flash memory device, a time to erase a flash block of the flash memory device, and a time to reset the flash memory device.

18. The system of claim 14, wherein the hardware parameter is one from the group of a temperature, a humidity, a voltage, a power supply, and a clock frequency related to the flash memory device.

* * * * *